United States Patent
Rizzi et al.

(10) Patent No.: US 7,664,752 B2
(45) Date of Patent: Feb. 16, 2010

(54) AUTHORIZATION OVER A DISTRIBUTED AND PARTITIONED MANAGEMENT SYSTEM

(75) Inventors: Lorenzo Rizzi, Kirkland, WA (US);
 Abbot L. Moffat, Redmond, WA (US);
 Brijesh D. Bhatia, Redmond, WA (US);
 Ian C. Jirka, Snoqualmie, WA (US);
 Sandeep Phadke, Bellevue, WA (US);
 Travis A. Wright, Everett, WA (US);
 Varsha Jayasimha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 11/095,762

(22) Filed: Mar. 31, 2005

(65) Prior Publication Data
 US 2006/0224591 A1  Oct. 5, 2006

(51) Int. Cl.
 *G06F 17/30* (2006.01)

(52) U.S. Cl. .................... 707/9; 707/1; 707/10

(58) Field of Classification Search ............ 707/1, 707/9, 10; 726/2, 4, 6, 8, 17, 21, 27–30
See application file for complete search history.

(56) References Cited

U.S. PATENT DOCUMENTS

| 6,178,511 | B1 * | 1/2001 | Cohen et al. ................ 726/6 |
| 6,535,879 | B1 * | 3/2003 | Behera ........................ 707/9 |
| 6,970,842 | B1 * | 11/2005 | Ashby ....................... 705/38 |
| 7,072,807 | B2 * | 7/2006 | Brown et al. ................ 703/1 |
| 7,171,411 | B1 * | 1/2007 | Lewis et al. ................ 707/9 |
| 2006/0075219 | A1 * | 4/2006 | Callaghan et al. ......... 713/156 |
| 2006/0206922 | A1 * | 9/2006 | Johnson et al. ............. 726/4 |

* cited by examiner

*Primary Examiner*—Cam-Linh Nguyen
(74) *Attorney, Agent, or Firm*—Lee & Hayes, PLLC

(57) ABSTRACT

In a management system, a management server authorizes users to access computing devices based on class space and instance space. The management server further determines whether users are authorized to use particular computing devices and/or applications provided by the particular computing devices. Alerts may also be provided to the users by the management server.

21 Claims, 6 Drawing Sheets

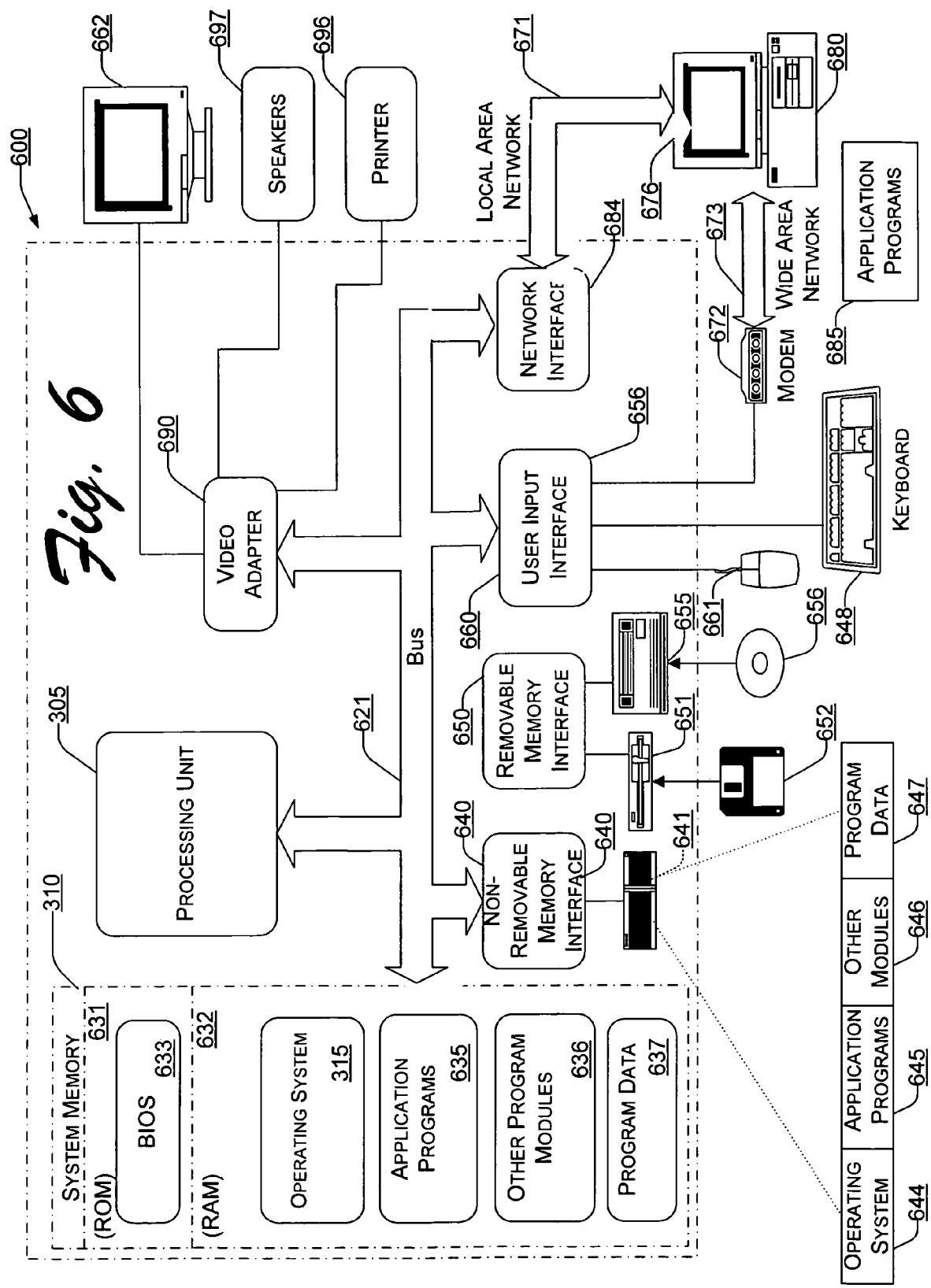

AUTHORIZATION OVER A DISTRIBUTED AND PARTITIONED MANAGEMENT SYSTEM

TECHNICAL FIELD

This invention relates to authorizing entities or users by a management server in a management system that includes distributed computing devices.

BACKGROUND

Management systems typically include a management authority (i.e., a management server) and multiple computers or computing devices. Entities or users are given selective access or authorization to the computing devices. In particular, access or authorization is given to applications, programs, and/or data provided by the computing devices.

Typically, authorization is given to users to perform a particular action, which is applied in general to all computing devices and/or applications in which the action applies. Authorization is not scoped to a particular class of computing devices and/or applications or scoped to a particular instance. A user may be given broader authorization than desired. The user may be able to access or control more applications and/or computing devices than the management authority desires.

In many instances it is desirable to scope or limit users to perform actions or have authorization as to specific computers and/or applications. Such authorization or scoping may be to a class space or an instance space. For example, this authorization may limit access of the user to a specific instance of a particular application provided by a particular computing device.

SUMMARY

In a management system that includes multiple distributed computing devices managed by a management server, users are authorized by the management server based on class space and instance space. Class space is directed to the group of computing devices and/or applications provided by the computing devices, and instance space may be directed to a group of computing devices and/or a particular applications. The management server creates authorization relationships of users based on class space and instance space. Authorization is performed by the management server when a user requests to access a computing device or perform a particular task.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

FIG. 6 is a block diagram of a detailed implementation of a management server in which user authorization is based on class space and instance space.

DETAILED DESCRIPTION

The following disclosure describes techniques in which users or entities are authorized to access computing devices by class and instance space.

Figure 1:
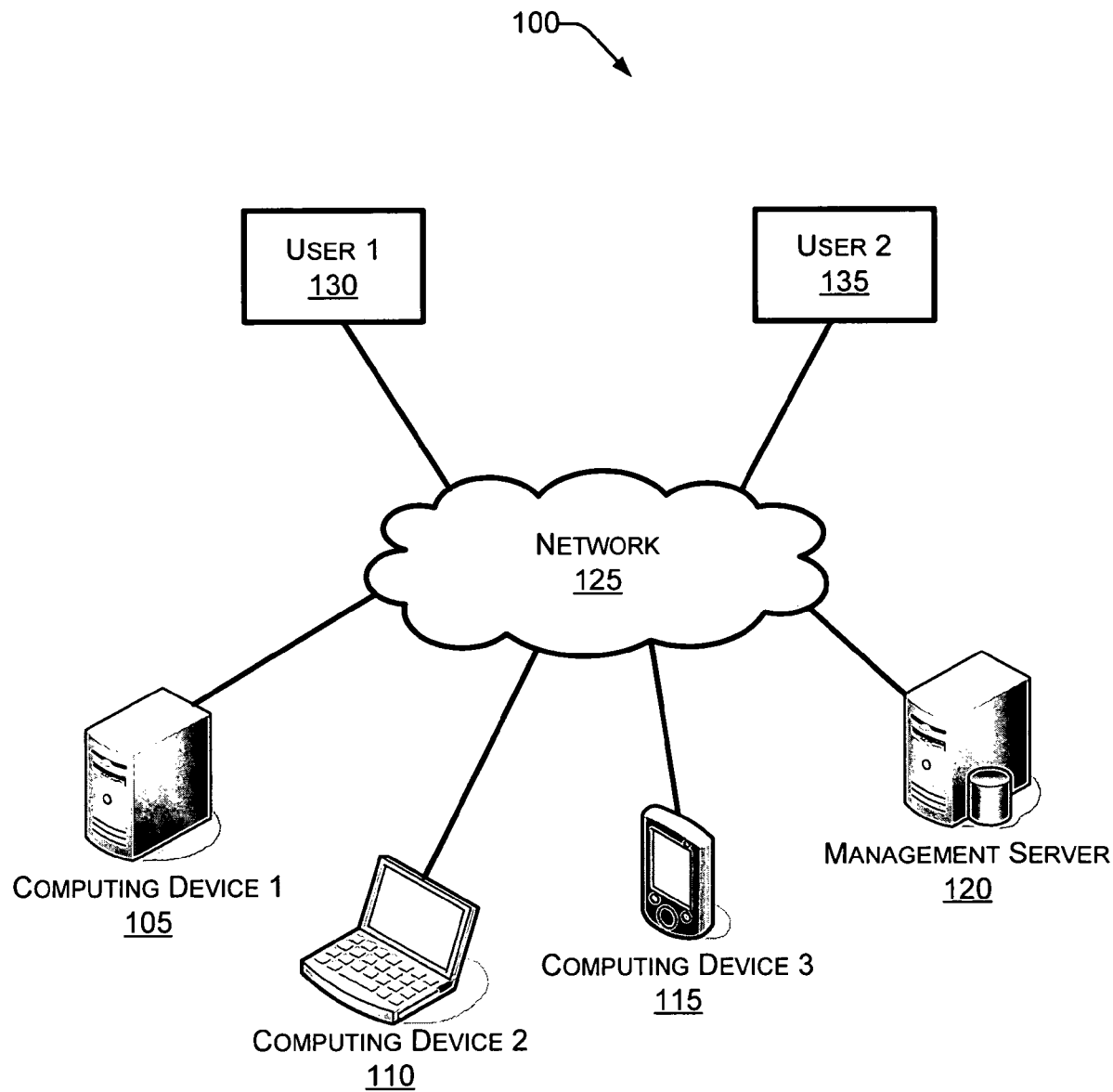
FIG. 1 is an illustration of a management system that authorizes users based on class space and instance space.

FIG. 1 shows a management system 100 that authorizes users. In particular, the management system 100 provides for class space and instance space authorization of computing devices included in management system 100. In this example, "computing device 1" 105, "computing device 2" 110, and "computing device 3" 115 are included in management system 100. Computing devices 105-115 are managed by a management server 120. Since computing devices 105-115 are distributed computing devices managed by a separate or standalone management server 120, management system 100 is considered a "distributed" management system.

"Computing device 1" 105 is shown as a desktop personal computer (PC). "Computing device 2" 110 is shown as a laptop PC. "Computing device 3" 115 is shown as a personal digital assistant (PDA). It is contemplated that in other cases, management system 100 includes other computing devices such as smart phones, media players, dedicated server computers, and the like.

As part of the management system 100, each of computing devices 105-115 includes a management agent that allows management server 120 to authorize entities or users to access computing devices 105-115 and particular applications and/or data provided by or through computing devices 105-115. By allowing authorization of users or entities based on either instance space and/or class space, management system 100 is considered a "partitioned" management system.

Management server 120 includes a management service interface that communicates with the management agents of computing devices 105-115. Management agents (as well as updates of management agents) of computing devices 105-115 may be received from management server 120. The management agents and management service interface are discussed in greater detail below.

A network 125 connects computing devices 105-115 with management server 120. In particular, the network 125 allows management server 120 to authorize or provide access by entities or users to computing devices 105-115. Network 125 may include one or more networks such as the Internet, local area networks, wide area networks, wired networks, and wireless networks.

In this example, the network 125 also connects "user 1" 130 and "user 2" 135 to computing devices 105-115. Users 130 and 135 are treated as entities that may be defined by a particular name, address, or identifier. For example, users 130 and 135 may be employees of a company; customers of a particular service; administrators of an organization, etc. Users 130 and 135 may access the network 125 through one or more devices such as a workstation, dedicated PC, PDA, smart phone, etc. In particular, users 130 and 135 access the network 125 in order to communicate with management server 120 and computing devices 105-110. By class space, instance space, or both, management server 120 authorizes users 130 and 135 to access computing devices 105-105 and/or applications provided by or through computing devices 105-110.

Figure 2:
FIG. 2 is an illustration of user authorization based on class space and instance space.

FIG. 2 shows authorization of an entity by class space and instance space. In this example, a User N 200 (e.g., user 130 and 135 of FIG. 1) is authorized by a management server (e.g., management server 120 of FIG. 1). In specific, User N 200 is authorized by class space 205 and instance space 210. Authorization is illustrated or described by uniform resource indicator (URI) notation; however, in other cases the authorization may be described by other notations, techniques, and the like.

The example shows class space 205 that defines a class of Windows® 2003 computers which are part of the more general class of Windows® computers. Windows® computers are further part of a class "computers". The "computers" class is part of an overall general class of "devices". Therefore, as defined by the URI notation, User N 205 is authorized in class space to perform actions as to the specific class of Windows® 2003 computers.

Furthermore, authorization is provided to User N 200 by an instance space 210. In this example, instance space 210 is a URI notation that defines the instance space to a particular server referred to as "JohnDoeServer1". User N 200 is provided a domain space in general, as defined by "MyDomain". The domain space "MyDomain" may be applied to a group of computing devices; however, instance space narrows the computing devices to the server "JohnDoeServer1". "JohnDoeServer1" is part of a group "allcomputers" which is included in a group "westcoastservers".

Figure 3:
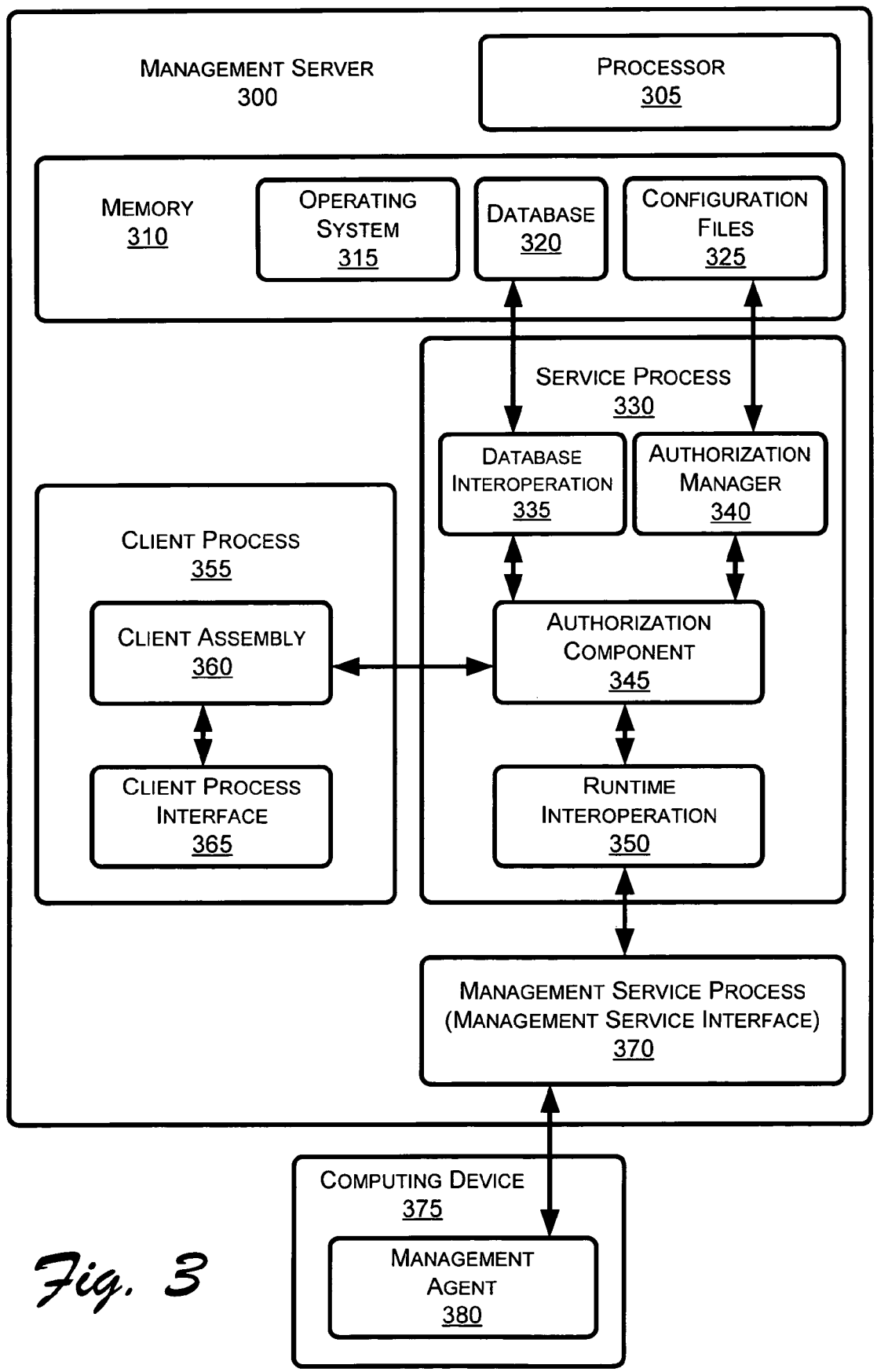
FIG. 3 is a block diagram of a management server that authorizes users based on class space and instance space.

FIG. 3 shows a management server 300 that authorizes users based on class space and instance space. In this example, management server 300 includes management server 120 of FIG. 1. Management server 300 has a central processing unit (CPU) or processor 305 and a memory 310. Processor 305 accesses memory 310 through a system bus (not shown).

The memory 310 may store an operating system 315. A database 320 is also shown stored in memory 310. Database 320 stores class space (e.g., class space 205) and instance space (e.g., instance space 210) notations that define client authorizations. Memory 310 also stores service configuration or configuration files 325 that includes security data and/or meta-data that defines scope of authority or actions that may be performed on the class space and/or instance space notations stored in database 320.

A management service process component or service process 330 is included in management server 300. Service process 330 provides for authorizing and connecting users to particular computing devices and/or applications. Furthermore, service process 330 may receive alerts as to connections of users to computing devices, and run tasks such as determining access of authorization of users to particular computing devices and/or applications, where such authorization is based on class space and/or instance space.

Service process 330 includes a component database interoperation 335 that interfaces with database 320. Database interoperation 335 accesses class space and instance space authorizations stored in database 320. Accessing authorizations may be part of actions or tasks directed to retrieving alerts or access checks as to particular users.

Service process 330 includes a component that interfaces with configuration files 325, shown as authorization manager 340. Authorization manager 340 interfaces with operating system 315, such that operating system 315 controls or runs service process 330.

Database interoperation 335 and authorization manager 340 communicate with an authorization component 345 that is included in service process 330. Based on authorization in class space and/or instance space, authorization component 345 is used in validating connections between users and computing devices, and validating tasks requested by users.

Authorization component 345 communicates with a component shown as runtime interoperation 350 that is also included in service process 330.

Service process 330, through authorization component 345, communicates with a client process component or client process 355. Client process 355 provides control and monitoring of distributed client computing devices. Control includes connecting to distributed client computing devices, and running tasks (i.e., instructing tasks to be executed) at the distributed client computing devices.

Client process 355 includes a client assembly 360 that communicates with authorization component 345. Client assembly 360 passes on requests such as requests for connection, requests for alerts, as well as requests to perform tasks. Such requests may be received through a client process interface 365 which communicates with operating system 315. In certain cases, client process 355 is separate from management server 300, and may provide a user interface (UI) for an operator to provide (enter) such requests.

In this example, management server 300 includes a management service process 370 component which particularly provides a management service interface. Management service process 370 communicates with service process 330 and specifically to runtime interoperation 350. Management service process 370 through its management service interface connects with one or more client computing devices such as computing device 375.

Computing device 375 includes computing devices 105-115 of FIG. 1. Computing device 375 has a management agent 380 that communicates with management server 300, and particularly with service process 370. Management agent 380 is particularly used to identify computing device 375 to management server 300, and may include information as to hardware and/or software configuration of computing device 375.

Figure 4:
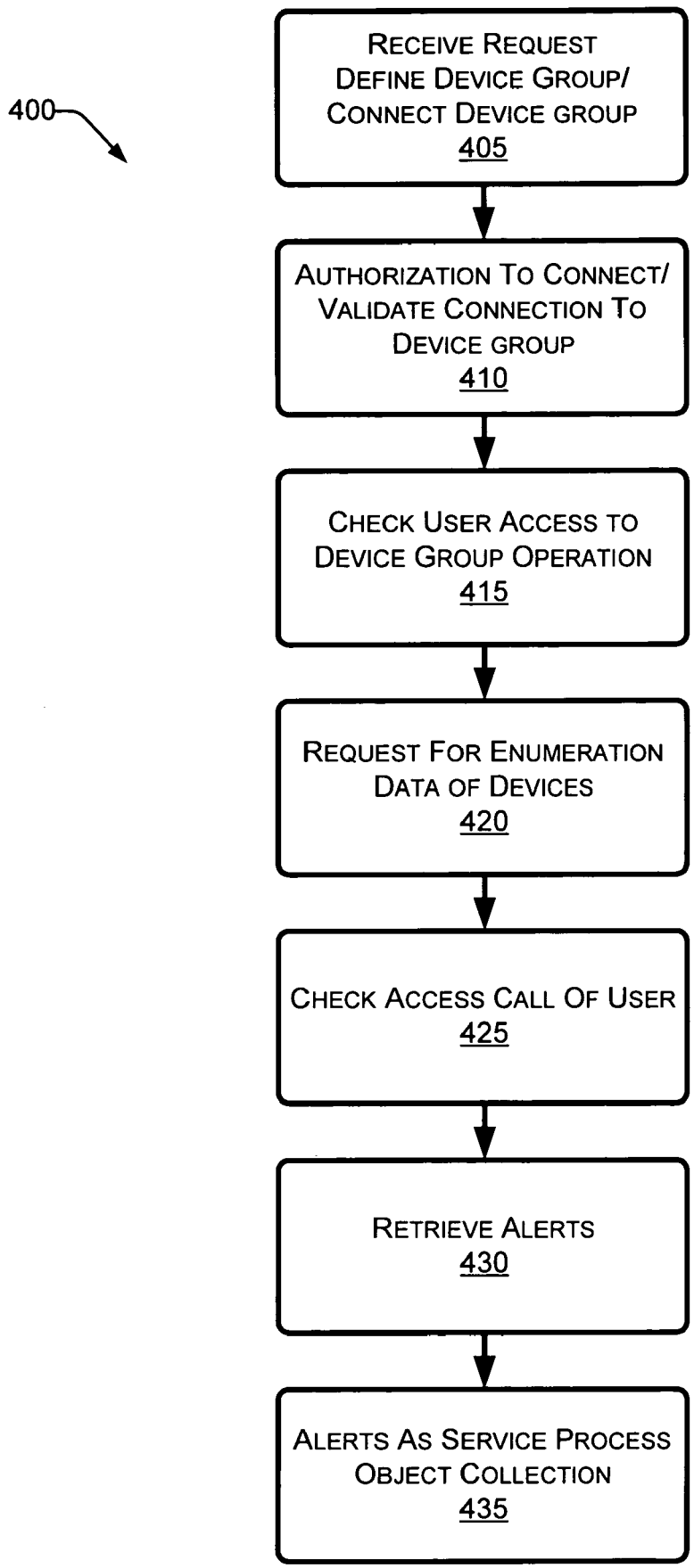
FIG. 4 is a flow diagram illustrating a process for a management server to authorize a user and provide alerts to the user.

FIG. 4 shows a process 400 a process for a management server to authorize a user and provide alerts to the user. The process 400 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 400 is described with reference to management server 300 described above. Although described as a flowchart, it is contemplated that certain processes may take place concurrently or in a different order.

At block 405, a request is received to authorize a user to connect to a group of computing devices controlled by the management server as part of a distributed management system. The computing devices may be defined as a class of computing devices or a group of computing devices. Block 405 may be initiated by an authorization request received from the user. The received request may further identify specific applications or functions performed by the defined computing devices.

At block 410, authorization is performed to the user to connect (i.e., connect to the management server) and validation as to a device or device group. Validation may include creating class space and/or instance space authorizations stored in a database, where such authorization relationships may be accessed and referred to later by the management server.

At block 415, user access (authorization) is checked. In particular, the check is to determine if the user is authorized to perform or execute certain operations or actions, where such operations or actions may be stored in a configuration file or files (e.g., configuration files 325). The user has been given particular authorization as to class space and/or instance space directed to a particular device or group of devices.

At block 420, regardless of whether the user has access or authorization as to the group of computing devices or particular computing devices as determined at block 420, a request for enumeration data of a particular device or group of devices is performed. Such enumeration data includes open alerts, operational data about the device or devices, and open issues about the device or devices.

At block 425, a check is performed to determine if the user is authorized to perform a particular function or call on an authorized application. Examples of functions or calls include read and/or write operations that are performed on an application authorized to the user.

At block 430, regardless of whether it is determined that the user is authorized to perform the particular function call or not, alerts are retrieved (collected) as to authorization to computing devices, applications, and function calls.

At block 435, the alerts are received as part of a service process object collection. In particular, the alerts are configured to be sent to the user, providing the user information as to authorization status and the degree of authorization (i.e., function call authority) that the user is given.

Figure 5:
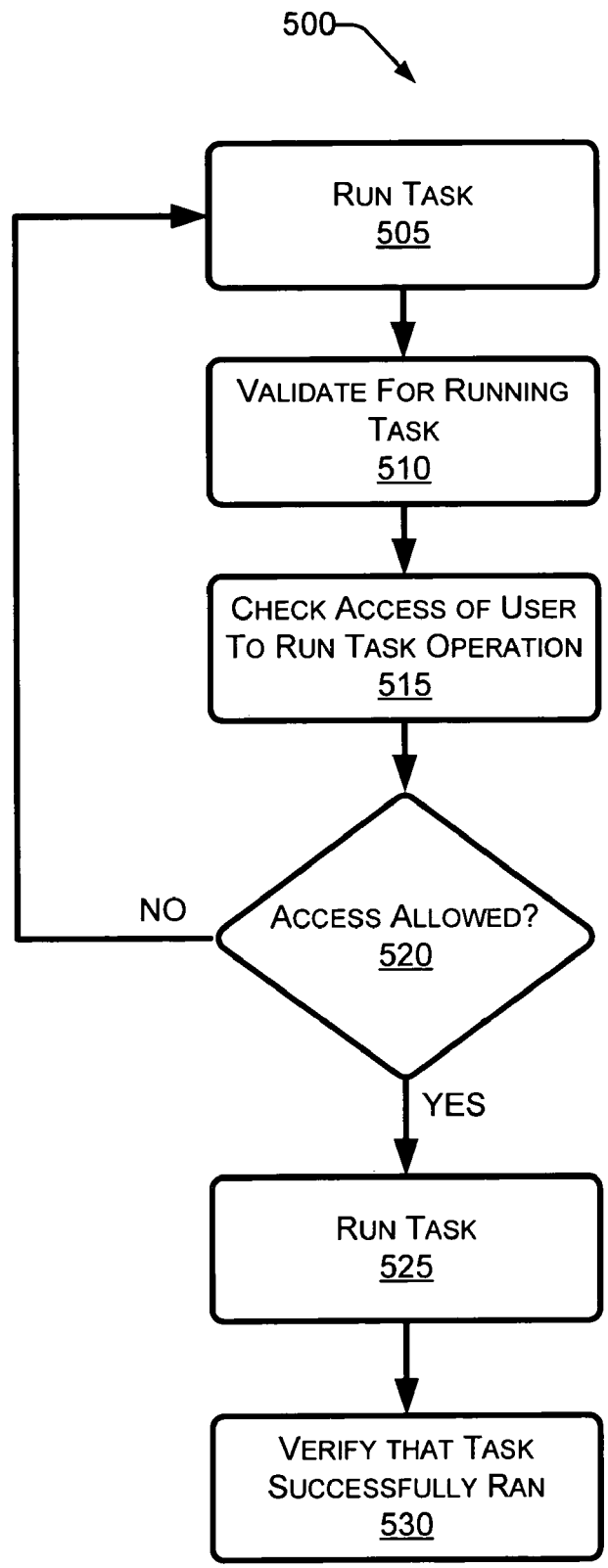
FIG. 5 is a flow diagram illustrating a process for running a task through a management server.

FIG. 5 shows a process 500 for running a task from a management server. In particular, the task is initiated or requested by user. The process 500 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 500 is described with reference to management server 300 described above. Although described as a flowchart, it is contemplated that certain processes may take place concurrently or in a different order.

At block 505, a request is received from a user to run a task. The particular task is directed to one or more computing devices. Examples of tasks include actions performed on a computing device, such as a reboot of the computing device; a request to access (use) a particular application (e.g., service); and a request for data. The access or authorization to perform the tasks is predetermined when the user is authorized in by class space and/or instance space.

At block 510, validation is performed as to whether the user is authorized to run the particular task on a particular computing devices or devices. The validation includes determining and gathering information as to the particular computing device(s), the task requested to be ran, and specific function calls related to the task.

At block 515, using the validation information, a check is made as to a predetermined authorization to the user based on class space and/or instance. The predetermined authorization is directed to access or use of the user of a group of computing devices, a particular computing device, and/or applications provide by or through the group of computing devices or particular computing device. Authorization relationships stored in database may be looked at in determining whether the user is authorized to perform the requested task.

If it is determined that access is not allowed (i.e., following the NO branch of block 520), block 505 may be performed to run another request from the user. If the determination is that access is allowed (i.e., following the YES branch of block 520), the process 500 proceeds to block 525.

At block 525, the user requested task is ran or initiated to run by the management server. In other words, the management server instructs a computing device or devices in which the request is directed, to perform or run the task.

At block 530, verification is provided to the user that the task has been successfully performed or run. The verification may be in the form of an alert to the user or in the form of an identifiable action related to the requested task.

Exemplary Management Server

FIG. 6 shows an exemplary management server 600, which includes management server 300 of FIG. 3. Management server 600 is suitable as an environment for practicing aspects of the subject matter. The components of management server 600 may include, but are not limited to processing unit 305, system memory 310, and a system bus 621 that couples various system components including the system memory 310 to the processing unit 305. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Exemplary management server 600 typically includes a variety of computer-readable media. Computer-readable media can be any available media that can be accessed by management server 600 and includes both volatile and nonvolatile media, removable and non-removable media. By way of example, and not limitation, computing device-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by management server 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 310 includes computing device storage media in the form of volatile and/or nonvolatile memory such as read only memory (ROM) 631 and random access memory (RAM) 632. A basic input/output system 633 (BIOS), containing the basic routines that help to transfer information between elements within management server 600, such as during start-up, is typically stored in ROM 631. RAM 632 typically contains data and/or program modules that are immediately accessible to and/or presently being operated on by processing unit 305. By way of example, and not limitation, FIG. 6 illustrates operating system 315, application programs 635, other program modules 636, and program data 637. Other program modules 636 may include service process 330 and client process 355 described above.

The management server 600 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface such as interface 650.

The drives and their associated computing device storage media discussed above and illustrated in FIG. 6 provide storage of computer-readable instructions, data structures, program modules, and other data for computer 600. In FIG. 7, for example, hard disk drive 641 is illustrated as storing operating system 644, application programs 645, other program modules 646, and program data 647. Note that these components can either be the same as or different from operating system 315, application programs 635, other program modules 636, and program data 637. Operating system 644, application programs 645, other program modules 646, and program data 647 are given different numbers here to illustrate that, at a minimum, they are different copies. A user may enter commands and information into the exemplary computer 600 through input devices such as a keyboard 648 and pointing device 661, commonly referred to as a mouse, trackball, or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port, or in particular a USB port. A monitor 662 or other type of display device is also connected to the system bus 621 via an interface, such as a video interface 690. In addition to the monitor 662, computing devices may also include other peripheral output devices such as speakers 697 and printer 696, which may be connected through an output peripheral interface 695.

The exemplary management server 600 may operate in a networked environment using logical connections to one or more remote computing devices, such as a remote computing device 680. The remote computing device 680 may be a personal computing device, a server, a router, a network PC, a peer device or other common network node, and typically includes many or all of the elements described above relative to management server 600, although only a memory storage device 681 has been illustrated in FIG. 6. The logical connections depicted in FIG. 6 include a local area network (LAN) 671 and a wide area network (WAN) 673, but may also include other networks such as network 125 described above. Such networking environments are commonplace in offices, enterprise-wide computing device networks, intranets, and the Internet.

When used in a LAN networking environment, the exemplary management server 600 is connected to the LAN 671 through a network interface or adapter 670. When used in a WAN networking environment, the exemplary computer 600 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the exemplary management server 600, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computing devices may be used.

CONCLUSION

The above-described methods and management server describe authorizing users as to distributed computing devices and/or applications provided by the distributed computing devices of a management system. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method performed at a management server computer connected to one or more computing devices comprising:
   receiving, by the management server computer, a request from a particular computing device of a user to run a task at the one or more computing devices, wherein user authorization is based on instance space or class space, wherein the instance space specifies a group of computing devices accessible to the user, and wherein the class space specifies a class of computing devices accessible to the user;
   authorizing, by the management server computer, the user to run the task;
   validating, by the management server computer, the authority of the user to run the task; and
   verifying, by the management server computer, to the user by sending alerts to the particular computing device of the user that the task request has been successfully performed by the one or more computing devices.

2. The method of claim 1 wherein the receiving request includes identifying a particular application to be provided by the one or more computing devices.

3. The method of claim 1 wherein the authorizing includes authorizing the user to access a particular application provided by the one or more computing devices.

4. The method of claim 1 wherein the validating includes storing the class space and instance space for later access.

5. The method of claim 1 further comprising determining, by the management server computer, whether the user has authorization to access particular computing devices.

6. The method of claim 1 further comprising determining, by the management server computer, whether the user has authorization to access particular application programs of particular computing devices.

7. The method of claim 1 wherein the verifying to the user alerts that provide information as to authorization status of the user.

8. One or more computer-readable media comprising computer-executable instructions that, when executed, perform the method as recited in claim 1.

9. A method performed at a server computer connected to one or more computing devices comprising:
   receiving, by the server computer, a request from a user to access the one or more computing devices in a distributed management system, wherein user authorization is based on class space and instance space, the server computer managing the one or more computing devices as a portioned management system, wherein the class space specifies a class of computing devices accessible to the user, wherein the class of computing devices accessible to the user is based on an operating system executing at each of the computing devices of the class, and wherein the instance space specifies a group of computing devices accessible to the user;
   validating, by the server computer, whether the user is authorized to access the one or more computing devices;
   if authorized, instructing, by the server computer, the one or more computing devices to connect; and
   verifying to the user, by the server computer, a degree of authorization to perform a task when connected.

10. The method of claim 9 wherein the receiving a request includes requests to one or more of the following: access to all applications provided by the one or more computing devices; access to a particular application at the one or more computing devices; access to perform an action at the one or more computing devices.

11. The method of claim 9 wherein the validating is performed by accessing predetermined authorization relationships of the user based on class space and instance space.

12. The method of claim 9 further comprising receiving, by the server computer, another request if the validating determines that the user is not authorized to perform the task.

13. One or more computer-readable media comprising computer-executable instructions that, when executed, perform the method as recited in claim 9.

14. A management server of a management system that includes one or distributed computing devices, comprising:
   a processor;
   a memory coupled to the processor, the memory including an authorization database;
   a service process component that authorizes users based on class space and instance space and creates authorization relationships between the users and the one or more distributed computing devices, the authorization relationships being stored in the authorization database, wherein the class space specifies a class of computing device accessible to each particular user, and wherein the instance space specifies a group of computing devices accessible to each particular user; and
   a client process component that interfaces with the service process component and passes requests by the users to perform one or more tasks on the one or more distributed computing devices that are managed by the management server as a partitioned management system based on class space or instance space authorization of the users.

15. The management server of claim 14 wherein the memory includes configuration files that define user connection with the one or more distributed computing devices.

16. The management server of claim 14 wherein the service process component controls connecting of users with the one or more distributed computing devices.

17. The management server of claim 14 wherein the service process component monitors access of the users to the one or more distributed computing devices.

18. The management server of claim 14 wherein the service process component receives user alerts as to the one or more distributed computing devices.

19. The management server of claim 14 wherein the service process component validates the tasks requested by the users.

20. The management server of claim 14 wherein the client process component provides a user interface to enter the requests by the users.

21. A method performed at a server computer that manages one or more computing devices comprising:
   defining user acces to the one or more computing devices as to a particular class space and instance space of the one or more computing devices, wherein class space defines type of computing device and instance space defines a particular computing devices as part of a partitioned management system;
   receiving a request from a user to access the one or more computing devices;
   authorizing the user to connect to one or more of the computing devices; and
   validating the user to access the one or more computing devices based on the class space and instance space that defines access to the one or more computing devices.

* * * * *

UNITED STATES PATENT AND TRADEMARK OFFICE
CERTIFICATE OF CORRECTION

| | | |
|---|---|---|
| PATENT NO. | : 7,664,752 B2 | Page 1 of 1 |
| APPLICATION NO. | : 11/095762 | |
| DATED | : February 16, 2010 | |
| INVENTOR(S) | : Lorenzo Rizzi et al. | |

It is certified that error appears in the above-identified patent and that said Letters Patent is hereby corrected as shown below:

In column 8, line 65, in Claim 7, after "user" insert -- uses --.

In column 10, line 4, in Claim 14, delete "device" and insert -- devices --, therefor.

In column 10, line 32, in Claim 21, delete "acces" and insert -- access --, therefor.

In column 10, line 36, in Claim 21, delete "devices" and insert -- device --, therefor.

Signed and Sealed this

Fifteenth Day of February, 2011

David J. Kappos
*Director of the United States Patent and Trademark Office*